United States Patent [19]
Teti et al.

[11] 3,920,793
[45] Nov. 18, 1975

[54] CORROSION-RESISTANT PERFLUOROCARBON POLYMER COATED METAL SUBSTRATE AND PROCESS FOR PREPARING THE SAME

[75] Inventors: John Teti; Michael D. Yallourakis, both of Wilmington, Del.

[73] Assignee: E. I. Du Pont de Nemours and Company, Wilmington, Del.

[22] Filed: Apr. 2, 1973

[21] Appl. No.: 346,867

[52] U.S. Cl. ............ 428/215; 427/192; 427/195
[51] Int. Cl. .... B44d 1/36; B32b 15/08; C08f 45/24
[58] Field of Search............ 117/75, 132 CF, 128.4, 117/161 ZA, 132 R, 132 BS

[56] References Cited
UNITED STATES PATENTS

| | | | |
|---|---|---|---|
| 3,102,826 | 9/1963 | Moutaud...................... | 117/132 CF |
| 3,194,428 | 7/1965 | Dereich ........................ | 117/132 CF |
| 3,377,193 | 4/1968 | Stillmar........................ | 117/132 CF |
| 3,644,260 | 2/1972 | Strolle.......................... | 117/75 |
| 3,692,558 | 9/1972 | Werner......................... | 117/75 |
| 3,697,309 | 10/1972 | Werner......................... | 117/75 |

Primary Examiner—William R. Trenor

[57] ABSTRACT

The corrosion-resistant perfluorocarbon polymer coated metal substrate is prepared by applying to the metal substrate, which is either of iron, steel or aluminum, a corrosion-retardant finish of a thermally stable binder such as a polyalkyl silicate that has dispersed therein finely divided particles of zinc; a perfluorocarbon polymer primer composition, for example, a PTFE or FEP-fluorocarbon polymer with chromic acid and phosphoric acid, is sprayed onto the corrosion-retardant finish and dried; then a powder coating composition of a perfluorocarbon polymer is applied and baked to provide a top-coating. The product has particularly good corrosion resistance and can be used for piping, reaction vessels, pipe flanges, and for other end uses which require an inert finish that has a good corrosion resistance.

12 Claims, 1 Drawing Figure

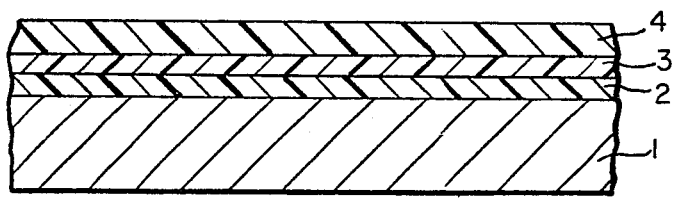

CORROSION-RESISTANT PERFLUOROCARBON POLYMER COATED METAL SUBSTRATE AND PROCESS FOR PREPARING THE SAME

BACKGROUND OF THE INVENTION

This invention relates to a coated metal substrate and to a process for preparing this substrate.

Perfluorocarbon polymer coating compositions in the form of latices or organic dispersions are well known in the art and have been utilized to coat metal substrates. However, finishes of these perfluorocarbon polymers do not have a high degree of corrosion resistance to chemicals such as strong acids and bases and to hot water and corrode after relatively short periods of exposure, even when the proper perfluorocarbon primer is utilized. Also, dispersions or latices of the perfluorocarbon polymer do not allow for application of thick finishes of the perfluorocarbon resin in one coat without mud-cracking and flaking of the finish. This occurs when the application of the dispersion exceeds about 0.5–0.6 mils and multiple coat applications are restricted to 6 mils because of the bubbling and blistering problems.

There is a great need in the industry for a finish that will be inert to all types of chemicals and that will also provide good corrosion resistance to the metal substrate and that allows for the application of thick layers of the composition to provide a finish that is extremely durable and will withstand abrasion, buffing, scratching, and the like. The novel coated metal substrate of this invention has exceptional corrosion-resistant properties and the perfluorocarbon polymer finish is applied from a powder coating which now allows the application of a thick, durable finish of the perfluorocarbon polymer.

SUMMARY OF THE INVENTION

The corrosion-resistant perfluoro polymer coated metal substrate consists essentially of:
A. a metal substrate of a ferrous metal or aluminum having firmly adhered thereto a layer of
B. a corrosion-retardant finish of a thermally stable binder such as a polyalkyl silicate which has dispersed therein finely divided particles of zinc and having firmly adhered thereto a primer layer of
C. a perfluorocarbon polymer blended with an adhesion promoter and a corrosion-protection agent and that is top-coated with a coalesced layer of
D. a perfluorocarbon polymer, such as a polytetrafluoroethylene or a copolymer of tetrafluoroethylene/hexafluoropropylene.

The novel process for preparing the corrosion-resistant perfluorocarbon polymer metal substrate is also part of this invention.

BRIEF DESCRIPTION OF THE DRAWING

The drawing illustrates a cross section of the corrosion resistant perfluoro polymer coated metal substrate of this invention. The metal substrate (1) has firmly adhered thereto a corrosion retardant finish (2) of the thermally stable binder that has zinc particles dispersed therein; in firm adherence to the corrosion retardant finish is a primer layer (3) of the perfluorocarbon polymer and the adhesion promoter and corrosion protective agent; in firm adherence to the primer layer is a top coat (4) formed of a coalesced layer of the perfluorocarbon polymer.

DESCRIPTION OF THE INVENTION

The novel coated substrate of this invention has a good corrosion resistance and the perfluorocarbon polymer top coat has excellent chemical resistance and excellent slip and release properties. This makes the product particularly useful for pipes, chemical reactors, distillation columns, mixing vessels, and numerous other applications which require corrosion resistance, chemical inertness and good release properties of the finish of a coated substrate.

Preferably, the novel coated substrate of this invention has about 0.5–5 mils of the corrosion retardant finish, about 0.1–0,7mils of the perfluorocarbon primer and about 0.5–30 mils or more of the perfluorocarbon polymer top coating. For most applications, it is preferred to utilize 1–3 mils of an alkyl polysilicate/zinc corrosion retardant finish with about 0.2–0.4 mils of a perfluorocarbon primer and about 0.2–10 mils of the perfluorocarbon polymer topcoat.

The corrosion retardant finish utilized in this invention comprises a thermally stable binder that has dispersed finely divided particles of zinc. A variety of thermally stable binders can be utilized such as polyimide resins, polyamideimide resins, high temperature polyamides and the like. However, for most applications it is preferred to use a composition of about 5–50% by weight of a polyalkylsilicate such as ethyl polysilicate that is blended with about 95–5% by weight of zinc. dust. One preferred polyalkylsilicate finish is disclosed in Oken U.S. Pat. No. 3,649,307, issued Mar. 14, 1972, which is incorporated hereby by reference.

One preferred finish contains about 100 parts of ethylpolysilicate with about 1–25 parts of boric acid in an organic solvent for the boric acid which is reacted at a temperature of about 70°C. to about 140°C. until the reaction is completed. About 6–50% by weight of this composition is then blended with about 50–94% by weight of particulate zinc to form the finish. Preferably the composition contains about 15–25% by weight of the above prepared composition and 65–85% by weight of finely divided zinc.

The corrosion retardant finish is applied to a sandblasted steel or iron substrate or to a roughened aluminum substrate by either spraying or brushing and then the finish is air-dried or force-dried at moderately elevated temperatures.

A primer composition of perfluorocarbon polymer that is blended with an adhesion promoter and a corrosion protective agent is next applied to the corrosion retardant finish, preferably by spraying and then dried at temperatures of up to 260°C. Particular care is taken not to melt and coalesce the perfluorocarbon polymer, but simply to dry the finish. The perfluorocarbon polymer should be chosen so that it is compatible with the topcoat. The reason being that when the topcoat is sintered to coalesce the finish, the perfluorocarbon polymer of the primer should not decompose. To have good adhesion, the topcoat polymer coalesces with the perfluorcarbon polymer of the primer layer.

A wide variety of perfluorocarbon polymers can be used in the primer composition, such as polyvinylidene fluoride, a copolymer of tetrafluoroethylene and hexafluoropropylene, polytetrafluoroethylene, polyvinylfluoride, a copolymer of tetrafluoroethylene/perfluoropropylvinyl ether, a copolymer of tetrafluoroethylene and fluorinated polyethylene, a chlorinated trifluoroethylene polymer and ethylene chlorotetrafluoroethylene polymer. Preferably, the perfluorocarbon polymer is blended with an acid catalyst in a weight ratio of about 25/75 to about 60/40.

Typical acid catalysts that are utilized are phosphorous acid and chromic acid in a weight ratio of about 90/10 to about 10/90 with the preferred ratio being about 40/60 to about 60/40 and are disclosed in U.S. Pat. Nos. 2,562,117 and 2,562,118, issued July 24, 1951 to Osdal.

After the primer composition has been applied, the perfluorocarbon polymer topcoat then is applied preferably by electrostatic spraying. Preferably, a perfluorocarbon polymer powder is applied and then coalesced at elevated temperatures of about 200°–350°C. A powder coating of the perfluorocarbon polymers are particularly preferred since the thickness of the topcoating can be increased on up to 30 mils or more by applying multiple layers of the powder coating and then coalescing the powder coating between each application.

It is possible also to deposit the perfluorocarbon polymer topcoat from an aqueous dispersion or an organosol. However, the thickness of the topcoat only can be increased to about 0.5–0.6 mils before mud cracking and flaking of the finish occurs and the total thickness can be only about 5–6 mils.

Any of the aforementioned fluorocarbon polymers can be used as a top-coating. However, polytetrafluoroethylene, the copolymer of tetrafluoroethylene/hexafluoropropylene in a weight ratio of about 95/5 to about 50/50, and more preferably 75/25 to 92/8. Also, a copolymer of tetrafluoroethylene/perfluoroalkylvinyl ether disclosed in Harris et al. U.S. Pat. No. 3,132,123, issued May 5, 1964. One particularly preferred copolymer is a 97/3 copolymer of tetrafluoroethylene perfluoropropyl vinyl ether.

One particularly preferred powder coating which has spherical particles and excellent application properties which allows for particularly smooth coating is prepared by spray-drying a latex containing about 10–70% by weight of a copolymer of tetrafluoroethylene/hexafluoropropylene having a weight ratio of about 75/25 to about 92/8 and is dispersed with about 2–10% by weight of a surfactant, preferably a nonionic surfactant such as octylphenoxypolymethoxyethanol. This latex is spray-dried with conventional equipment by using a flow of heated air to evaporate the water. The coalesced powder particles are spherical in nature and have excellent properties for electrostatic deposition.

The following examples illustrate the invention. All parts and percentages are on a weight basis unless otherwise specified.

EXAMPLE 1

A polyethyl silicate solution is prepared as follows:

| PORTION 1 | PARTS, BY WEIGHT |
|---|---|
| Ethyl silicate | 317.94 |
| Isoproponyl | 113.98 |
| Diacetone alcohol | 71.50 |
| Ethylene glycol/monoethyl ether acetate | 271.44 |
| Toluene | 26.91 |
| Solvent of an Aliphatic petroleum (53% by volume paraffins, 37% by volume naphthenes, 10% toluene and ethyl benzene) | 26.19 |
| "Cab-o-sil" (finely divided silica pigment) | 46.29 |
| PORTION 2 | |
| Boric acid | 25.60 |
| TOTAL | 899.85 |

The ingredients of Portion 1 are added in the order set out above to a reaction vessel equipped with a stirrer, a reflux condenser, a heating mantle, and a thermometer. Then the ingredients are blended together for about fifteen minutes, and then Portion 2 is added. The reaction mixture is heated to its reflux temperature of about 90°C. and refluxed at a slow rate for about four hours under a blanket of nitrogen to form a polyethyl silicate solution.

A corrosion-retardant coating composition is prepared as follows:

| | PARTS, BY WEIGHT |
|---|---|
| Polyethyl silicate solution (prepared above) | 604 |
| Dry-blended pigment composition (97% zinc dust, 1% ferric hydroxide pigment, and 2% mica) | 1,571 |
| TOTAL | 2,175 |

The above ingredients are thoroughly blended together to form the coating composition.

The above corrosion-resistant coating composition is sprayed onto a sandblasted steel plate and onto sandblasted steel rods and air dried, giving a finish about 3 mils in thickness.

A perfluorocarbon primer composition is prepared as follows:

| PORTION 1 | PARTS, BY WEIGHT |
|---|---|
| Polytetrafluoroethylene dispersion (60% polymer solids dispersed with sodium lauryl sulfate) | 854.0 |
| Polytetrafluoroethylene dispersion (34% polymer solids in water dispersed with 3% sodium lauryl sulfate) | 42.0 |
| PORTION 2 | PARTS, BY WEIGHT |
| Sodium lauryl sulfate, an ionic surfactant | 39.5 |
| Mill base (1.2% channel carbon black, 43.3% titanium dioxide pigment, 0.5 sodium polynaphthalene sulfonate and 55% water | 193.5 |
| PORTION 3 | |
| Toluene | 548.0 |
| Total | 1183.0 |

Portion 1 is charged into a mixing vessel and throroughly blended together, and then Portion 2 is added and thoroughly mixed into the composition. Then the speed of the mixture is increased to form a vortex in the composition, and then Portion 3 is added. Deionized water is then added to form a composition having a 52% solids content.

An acid accelerator solution is prepared as follows:

| | PARTS, BY WEIGHT |
|---|---|
| Deionized water | 588 |
| Chromic acid flake | 253 |
| Phosphoric acid | 254 |
| TOTAL | 1,095 |

The above ingredients are charged into a stainless steel mixing vessel and thoroughly blended together to form the acid accelerator solution.

The primer composition is then prepared by blending 32 parts by weight of the acid accelerator solution with 100 parts by weight of the above perfluorocarbon primer composition and are thoroughly blended together. This composition is then sprayed onto the above-prepared coated steel plates and steel rods and baked at about 375°C. to form a primer layer about 0.3–0.4 mils in thickness.

A powder coating composition is prepared by spray-drying, using conventional spray-drying equipment and an FEP-fluorocarbon polymer latex. The FEP-fluorocarbon polymer latex has a 55% polymer solids content of a copolymer of tetrafluoroethylene and hexafluoropropylene in a weight ratio of 89 to 11, of the particle size and the polymer is 0.13 – 0.26 micron, and the aqueous latex is stabilized with about 5% of nonionic surfactant of octylphenoxypolyethoxyethanol. The resulting perfluorocarbon powder coating composition comprises a powder of spherical particles formed by the agglomeration of the perfluorocarbon polymer particles while being spray-dried, and the particles have a size of about 2 to 35 microns.

The perfluorocarbon polymer powder composition is electrostatically sprayed onto the primer layer of the steel substrates and the steel rods to a coating thickness of about 1.5 mils, and then the coated substrates are baked at about 330°C. for about 30 minutes. The substrates are recoated and baked until a 5-mil thick layer of the perfluorocarbon polymer coating is formed.

A second set of steel panels and steel rods is prepared as above, except the corrosion-retardant finish of the polyethyl silicate and zinc dust is omitted.

The two sets of panels and steel rods are then tested for corrosion resistance. In one test, one half of the steel panel is subjected to distilled water held at 95°C., and the other half of the panel is subjected to the water vapor at this temperature. The steel plates coated with the combination of the retardant finish of the polyethyl silicate/zinc and primer and FEP-fluorocarbon top-coat showed no under-film corrosion during a 6-week exposure period, while the panels coated only with the perfluorocarbon primer and the FEP-fluorocarbon topcoat exhibited blistering, indicating under-film corrosion in less than one week and severe corrosion after the six-week period.

The coated steel rods were subjected to low concentrations of hydrochloric acid, sulfuric acid, nitric acid, sodium hydroxide, sodium chloride, and also distilled water, each composition being maintained at about 50°C. The rods coated with the combination of the corrosion-retardant finish of polyethyl silicate/zinc and a perfluorocarbon primer and an FEP-fluorocarbon topcoat had a good resistance to corrosion from the fumes and the liquid compositions even after one month, whereas the rods coated only with the perfluorocarbon primer and the FEP-fluorocarbon top-coat showed underfilm corrosion after only a short period of exposure.

EXAMPLE 2

A steel plate is sprayed with the corrosion-retardant finish of polyethyl silicate/zinc prepared in Example 1 and allowed to air-dry, providing a film thickness of about 1.5 mils.

A primer composition is prepared as follows:

| PORTION 1 | PARTS, BY WEIGHT |
|---|---|
| FEP-fluorocarbon polymer dispersion (55% solids of a copolymer of tetrafluoroethylene/ hexafluoropropylene, weight ratio 89/11 dispersed in water with 5% octylphenoxypolyethoxyethanol) | 950.0 |
| Anionic surfactant (sodium laurylsulfate) | 38.5 |
| Mill base (described in Example 1) | 181.0 |
| Deionized water | 16.5 |
| TOTAL | 1,186.0 |

The above ingredients are added to a mixing vessel in the order given and are thoroughly mixed together and then deionized water is added to adjust the solids to about 51%.

To form the primer composition, about 40 parts by weight of the acid accelerator solution prepared in Example 1 is added to 100 parts by weight of the above-prepared primer composition and thoroughly blended together. The resulting composition is then sprayed onto the panel coated with the polyethyl silicate/zinc finish and baked at about 230°C. for 30 minutes.

The FEP powder coating composition prepared in Example 1 is then electrostatically sprayed onto the primed steel substrate and baked at about 330°C. for 60 minutes to form a layer about 1.5–2.0 mils thick. Subsequently, two more layers of the powder are applied with baking in between each step to provide an FEP-fluorocarbon polymer coating of about 5.6 mils. The resulting finish has an excellent and smooth appearance and is resistant to corrosion by acids, bases, and heated distilled water.

We claim:

1. A corrosion-resistant perfluorocarbon polymer coated metal substrate consisting essentially of
   A. a metal substrate of a ferrous metal or an aluminum metal having firmly adhered thereto a layer of
   B. a corrosion-retardant finish of a thermally stable binder having dispersed therein finely divided particles of zinc in which the finish consists essentially of 5–50% by weight of an alkyl polysilicate and 95–50 per cent of finely divided zinc and having adhered thereto a primer layer of
   C. a perfluorocarbon polymer blended with an adhesion promoter and a corrosion-protective agent in which the perfluorocarbon polymer is either polytetrafluoroethylene or a copolymer of tetrafluoroethylene and hexafluoropropylene; and being top-coated with a coalesced layer of
   D. a perfluorocarbon polymer selected from the group consisting of polyvinylidene fluoride, polytetrafluoroethylene, a copolymer of tetrafluoroethylene and hexafluoropropylene, polyvinyl fluoride, a copolymer of tetrafluoroethylene and perfluoropropyl-vinyl ether, a copolymer of tetrafluoroethylene and fluorinated polyethylene, a chlorotrifluoroethylene polymer, and an ethylene chlorotetrafluoroethylene polymer.

2. The coated substrate of claim 1 in which the corrosion-retardant finish consists essentially of 5 – 50 percent by weight of ethyl polysilicate and 95 – 50 percent by weight of finely divided zinc.

3. The coated metal substrate of claim 1 in which the primer consists essentially of a polytetrafluoroethylene or a copolymer of tetrafluoroethylene and hexafluoropropylene and reacted phosphoric acid and chromic acid.

4. The coated metal substrate of claim 1 in which the topcoat is polytetrafluoroethylene.

5. The coated metal substrate of claim 1 in which the top coat is a copolymer of tetrafluoroethylene and hexafluoropropylene in a weight ratio of 95/5 to 50/50.

6. The coated metal substrate of claim 1 in which the top coat is a copolymer of tetrafluoroethylene and hexafluoropropylene in a weight ratio of 75/25 to 92/8.

7. The coated metal substrate of claim 1 having
0.5–5.0 mils thick of said corrosion-retardant finish;
0.1–0.7 mils of a primer of polytetrafluoroethylene or a copolymer of tetrafluoroethylene and hexafluoropropylene and reacted phosphoric acid and chromic acid;
0.5–30.0 mils of a topcoat of a perfluorocarbon polymer which is either polytetrafluoroethylene, a copolymer of tetrafluoroethylene and hexafluoropropylene or a copolymer of tetrafluoroethylene/perfluoropropylvinyl ether.

8. The coated metal substrate of claim 1 having
1–3 mils thick of the corrosion-retardant finish of 5–50% by weight of ethyl polysilicate and 95–50% by weight of finely divided zinc;
0.2–0.4 mils of a primer of polytetrafluoroethylene or a copolymer of tetrafluoroethylene/hexafluoropropylene and reacted phosphoric acid and chromic acid;
0.2–10.0 mils of a topcoat of a copolymer of tetrafluoroethylene and hexafluoropropylene.

9. A process for preparing the corrosion-resistant perfluorocarbon polymer coated metal substrate of claim 1 which comprises
A. applying a corrosion-retardant finish of a thermally stable binder that has dispersed therein finely divided particles of zinc in which the finish consists essentially of 5–50% by weight of an alkyl polysilicate and 95–50% of finely divided zinc and drying the finish;
B. spraying a primer composition on the corrosion-retardant finish of a perfluorocarbon polymer of polytetrafluoroethylene or a copolymer of tetrafluoroethylene and hexafluoropropylene blended with an adhesion promoter and a corrosion-protective agent and drying the primer at a temperature up to 260°C. without melting the perfluorocarbon polymer particles in the primer composition;
C. applying a topcoating onto the primer layer by spraying on a powder coating of a perfluorocarbon polymer and then baking the coated metal substrate at about 200° to 350°C. to coalesce the perfluorocarbon polymer topcoating in which the perfluorocarbon polymer is selected from the group consisting of polyvinylidene fluoride, polytetrafluoroethylene, a copolymer of tetrafluoroethylene and hexafluoropropylene, polyvinyl fluoride, a copolymer of tetrafluoroethylene and perfluoropropylvinyl ether, a copolymer of tetrafluoroethylene and fluorinated polyethylene, a chlorotrifluoroethylene polymer, and an ethylene chlorotetrafluoroethylene polymer.

10. The process of Claim 9 in which
a. the corrosion-retardant finish consisting essentially of 5–50 percent by weight of ethyl polysilicate and 95–50 percent by weight of finely divided zinc and is sprayed onto a steel substrate and then dried, providing a layer about 0.5–5.0 mils in thickness;
b. spraying a primer composition onto the corrosion-retardant finish in which the primer composition consists essentially of polytetrafluoroethylene or a copolymer of tetrafluoroethylene and hexafluoropropylene in a weight ratio of 95/5 to 50/50 and phosphoric acid and chromic acid and baking the primer at about 150°–260°C. to form a dried primer layer about 0.1–0.7 mils in thickness;
c. spraying on a powder coating of a perfluorocarbon copolymer of polytetrafluoroethylene, a copolymer of tetrafluoroethylene and hexafluoropropylene or a copolymer of tetrafluoroethylene/perfluoropropylvinyl ether and baking the powder coating at about 200°–350°C. to form a coalesced layer of the perfluorocarbon polymer about 0.5–30.0 mils in thickness.

11. The process of Claim 10 in which the primer consists essentially of a copolymer of tetrafluoroethylene and hexafluoropropylene in a weight ratio of 75/25 to 92/8 and chromic acid and phosphoric acid and in which the top coat powder composition is the aforementioned copolymer.

12. The process of Claim 10 in which the primer consists essentially of polytetrafluoroethylene and a chromic acid and phosphoric acid and the top coat composition is a powder of polytetrafluoroethylene.

* * * * *